Sept. 27, 1932.    J. W. McNEELY    1,879,377

SCREEN AND METHOD OF MAKING THE SAME

Filed Dec. 3, 1929

Inventor
James W. McNeely
By Lyon & Lyon
Attorneys

Patented Sept. 27, 1932

1,879,377

UNITED STATES PATENT OFFICE

JAMES W. McNEELY, OF LONG BEACH, CALIFORNIA

SCREEN AND METHOD OF MAKING THE SAME

Application filed December 3, 1929. Serial No. 411,280.

This invention relates to an improved type of screen adapted to be employed in classification of materials. The invention particularly relates to a screen structure which permits the use of fine mesh screens in shakers or vibratory screening apparatus. The invention also relates to a method whereby a fine mesh screen may be produced as a unitary body.

Various types of vibrating and shaking screens have been employed heretofore for the classification of materials. Screens of 20 mesh and finer, however, have not been used successfully in view of the fact that such fine mesh screens are relatively fragile and weak, and for this reason can not be employed in large sections. Such fine mesh screens are easily deformed and subject to sagging and even when supported on cross pieces, (such as vibrating bars), have a very short life, as the vibration between the cross piece and the screen causes a bending of the fine screen adjacent the cross piece or bar, which eventually causes the screen to break there.

An object of this invention is to disclose and provide a screen construction which will permit the use of fine mesh screens in vibratory or shaker types of classifiers and screening devices.

Another object is to disclose and provide a screen structure which will materially increase the life of a fine mesh screen.

Another object is to disclose and provide a screen construction which will permit the installation of a fine mesh screen as a unitary body, and in this manner obviate extremely careful and difficult installation problems now existing.

Another object is to disclose and provide a method of producing a unitary screen body for use in vibrating or shaker type screening and classifying machines.

In describing the invention, reference will be had to the appended drawing, in which.

Figure 1:
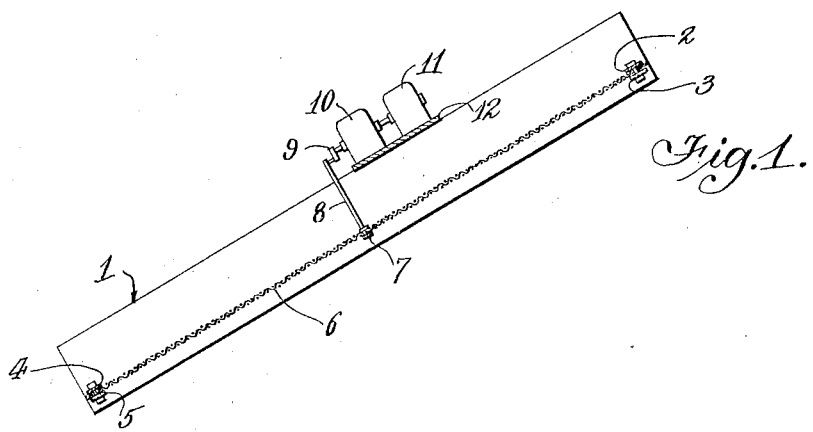
Fig. 1 is a diagrammatic representation of one type of inclined vibrating screen mechanism in which the invention may be placed in operation.

Fig. 1 illustrates, diagrammatically, one form of a customary type of screening apparatus. The apparatus may comprise a frame 1 having upper and lower clamping bars 2, 3, 4 and 5, respectively. A screen 6 of the proper mesh is then clamped at its lower end between the clamping bars 4 and 5 in any suitable manner, and the upper edge of the screen 6 then clamped between the bars 2 and 3. Certain screening devices include means whereby the clamping bars 2 and 3 may be longitudinally moved and positioned, thereby permitting the clamping of the screen between the bars 2 and 3 before the screen is placed under tension. Attention is here called to the fact that the screen 6 is held to the members 2, 3, 4 and 5, only at its ends, the side edges being left free to vibrate.

The screen 6, during operation, is preferably shaken, vibrated or oscillated. As shown in Fig. 1, a supporting bar 7 may be positioned beneath the screen 6 and connected to an upper yoke or arm 8. The arm 8 is then operatively connected to a crank 9 driven by means of a suitable gearing 10 from a motor 11. The gear box 10 and the motor 11 may be mounted on a transversely extending member 12 supported by the sides of the frame 1.

Operation of the motor will, therefore, cause the crank 9 to rotate and in this manner cause a vibratory motion to be set up in the screen 6, in view of the fact that the connecting link or yoke 8 is attached to the screen.

It is to be understood that the above description is merely illustrative of one general type of screening device. The screen 6 in the illustrative example reciprocates in a plane at right angles to the plane of the screen. In other types of screening devices, the screen may be caused to oscillate. The greatest amplitude of vibrations occurs near the clamping bar 7, said vibrations being dampened toward the ends of the screen 6 and away from the point at which the vibrations are imparted to the screen. When fine mesh screens are employed, it is impossible to place said screens under sufficient tension to permit the vibrations to extend over their entire area because of the inherent structural weakness of the screen. If the screen is not placed under sufficient tension, sagging will occur in the unsupported sections of the screen, as for example, between the bar 7 and the clamping bars 4 and 5.

Attempts have been made to place a heavy open mesh of various kinds, such as for example an ordinary two mesh screen or special flat surface mesh immediately beneath a fine mesh screen, such as a 20 to 100 mesh and finer screen, but it has been found that even if the shaker bar 7 is placed beneath the coarser screen so as to clamp the finer and coarser screens together, the finer screen will be cut up into small units corresponding to the configuration of the supporting screen, during usage. The natural period of vibration of a coarser screen differs from the natural period of vibration of a finer screen, and for this reason the two screens will repeatedly contact with each other with considerable force, thus permitting the material being screened to be caught between the two screens to cut into and destroy the finer screen.

In accordance with this invention, I have found that if a coarse flexible screen be placed under tension and a finer flexible screen then placed under tension above, and the two screens then firmly connected together substantially over their entire contact areas, then a unitary screen is produced which may be employed in the various devices utilizing such screens without causing the finer screen to be broken down.

Figure 2:
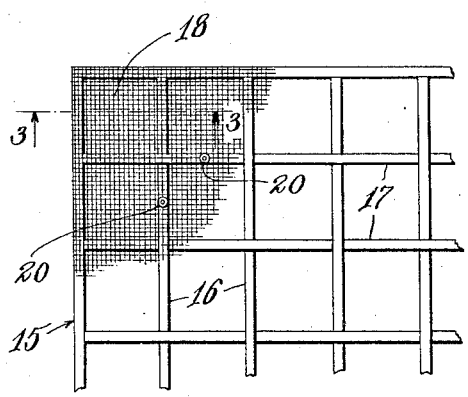
Fig. 2 is an enlarged plan view of a portion of a screen made in accordance with this invention.
Figure 3:
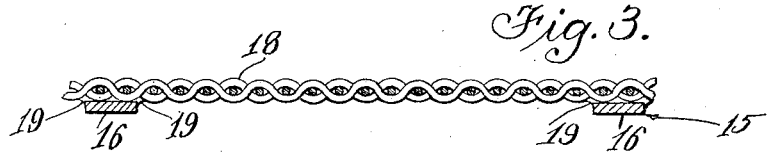
Fig. 3 is a vertical section, taken through a portion of the screen illustrated in Fig. 2, the section being taken along the line 3—3.
Figure 4:
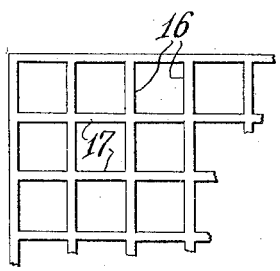
Fig. 4 is a plan view of a portion of supporting grating made from a unitary piece of material.

For example, as shown in Fig. 2, a large open mesh flexible screen 15 composed of preferably rectangular strand (or woof) and stay (or warp) members 16 and 17 woven or otherwise connected together, may be employed as a foundation. Instead of an open mesh screen, a grating cut or punched from a single sheet of material, as shown in Fig. 4, may be employed. The finer screen indicated at 18 and shown in more detail in Fig. 3 is then superimposed upon the foundation screen 15. The foundation screen 15 is then placed under tension and the finer screen 18 also placed under suitable tension. The foundation screen 15 is then connected to the finer screen 18, as for example, by means of solder 19 or by brazing the two together. In this manner, each of the areas of the fine screen 18 between the supporting meshes 16 and 17 is under a suitable tension and is maintained under such tension because of the greater rigidity of the supporting mesh 15. A combined screen structure made in accordance with this invention may thus be shipped as a complete unit and can be readily installed in classifying devices of the art, of the vibratory, shaker, oscillating and other types.

It is not necessary to exercise great care in the installation of such a combined screen, and it is impossible to subject the fine mesh 18 to an undesirable tension, as any tension which would be applied to the combined screen during installation would be preliminarily taken up by the foundation screen 15.

Furthermore, when such screen is vibrated as by means of a shaker bar 7, it vibrates and flexes as a unit and the vibrations carry all over the area of the screen; they are not dampened as they have been heretofore, but instead the foundation screen 15 carries the vibrations to all portions of the finer screen 18. In addition, the tendency for a fine screen to be cut up into smaller sections or squares because of the difference in natural frequency (as is the case when a "sub-screen" is used as heretofore), is obviated and the two screens vibrate as a unit. Material being screened is incapable of entering between the supporting screen 15 and the finer mesh 18 and cutting the finer screen into sections.

If the two screens have been soldered together, then if the upper screen 18 has been worn away by natural abrasion in usage, the foundation screen 15 may be recovered by merely heating the unitary screen and stripping the worn off fine mesh screen 18 therefrom.

By employing the method described hereinabove, fine screens of 100 mesh and finer may be used in commercial apparatus, and will be found to possess a life which renders them economically useful, whereas heretofore it has not been possible to employ screens of such fineness in commercial equipment because of the excessive wear and unsatisfactory characteristics.

Instead of soldering the finer mesh and the foundation mesh together as shown in Fig. 3, the two screens may be held together by means of small bolts and washers or rivets indicated at 20.

Numerous changes and modifications may be made in the details of construction, the invention not being limited to the precise structure shown, but embracing all such changes as come within the scope of the appended claims.

I claim:

1. As an article of manufacture, a unitary body comprising an open mesh flexible foundation screen, and a fine mesh screen in superimposed relation thereto, said fine mesh screen being maintained under tension in such position by means connecting said foundation screen and fine mesh screen at a plurality of points distributed over the area of said screen.

2. As an article of manufacture, a unitary body comprising an open mesh flexible and vibrationable foundation screen composed of warp and woof portions, and a fine mesh screen in superimposed coextensive relation thereto, said fine mesh screen being inseparably attached to said foundation screen at substantially all warp and woof portions thereof over the area of said foundation screen.

3. As an article of manufacture, a unitary body comprising an open mesh flexible and vibrationable foundation screen composed of warp and woof members, and a fine mesh screen in contact therewith, said fine mesh screen being soldered to said foundation screen at a plurality of points distributed over the area of said screen.

4. A method of producing a unitary fine mesh screen comprising placing an open mesh foundation screen under tension, placing a fine mesh screen under tension and in contact with said foundation screen, and then connecting said fine mesh screen to said foundation screen at a plurality of points distributed over the area of said screen.

5. A method of producing a unitary fine mesh screen comprising placing an open mesh foundation screen under tension, placing a fine mesh screen coextensive with said foundation screen under tension and in contact with said foundation screen, and then soldering said fine mesh screen to said foundation screen at a plurality of spaced points of contact distributed over and within the area of said foundation screen.

6. A method of producing the unitary fine mesh screen comprising placing a fine mesh screen under tension uniformly in all directions, contacting said screen with an open mesh foundation screen, and then connecting said fine mesh screen to said foundation screen at points of contact while said fine mesh screen is maintained under tension.

Signed at Los Angeles, Calif., this 19th day of November, 1929.

JAMES W. McNEELY.